US009856902B2

(12) United States Patent
Mushlin (10) Patent No.: US 9,856,902 B2
(45) Date of Patent: Jan. 2, 2018

(54) EXTRUDED METAL INSERT

(71) Applicant: Spirol International Corporation, Danielson, CT (US)

(72) Inventor: Miles H. Mushlin, Hartland, VT (US)

(73) Assignee: Spirol International Corporation, Danielson, CT (US)

( * ) Notice: Subject to any disclaimer, the term of this patent is extended or adjusted under 35 U.S.C. 154(b) by 340 days.

(21) Appl. No.: 14/603,612

(22) Filed: Jan. 23, 2015

(65) Prior Publication Data
US 2016/0215806 A1  Jul. 28, 2016

(51) Int. Cl.
| F16B 37/04 | (2006.01) |
| F16B 37/12 | (2006.01) |
| B23G 1/16 | (2006.01) |
| B23B 27/06 | (2006.01) |

(52) U.S. Cl.
CPC ............ *F16B 37/122* (2013.01); *B23B 27/06* (2013.01); *B23G 1/16* (2013.01)

(58) Field of Classification Search
CPC ....... F16B 37/122; F16B 13/124; B23B 27/06
USPC .......................................................... 411/180
See application file for complete search history.

(56) References Cited

U.S. PATENT DOCUMENTS

| 2,949,142 A | * | 8/1960 | Sumerak | F16B 37/122 |
| | | | | 29/432 |
| 2,989,354 A | * | 6/1961 | Merriman | F16B 37/122 |
| | | | | 384/296 |
| 3,530,921 A | * | 9/1970 | Ernest | F16B 37/122 |
| | | | | 264/249 |
| 3,866,510 A | * | 2/1975 | Eibes | B21H 3/027 |
| | | | | 411/418 |
| 4,067,371 A | * | 1/1978 | Stencel | F16B 37/122 |
| | | | | 411/107 |
| 4,143,579 A | * | 3/1979 | Ziaylek, Jr. | F16B 37/122 |
| | | | | 411/42 |
| 4,822,223 A | * | 4/1989 | Williams | F16B 37/122 |
| | | | | 403/268 |

(Continued)

OTHER PUBLICATIONS

The enclosed photograph shows two views of an insert with hexagonal retention features and a threaded through bore and one view of an insert with knurled retention features and a threaded stud.

*Primary Examiner* — Gary Estremsky
(74) *Attorney, Agent, or Firm* — Alix, Yale & Ristas, LLP (57) ABSTRACT

A metal insert having a body at a base diameter, a plurality of retention regions spaced apart and extending radially from the body, and an end effector at one end, for engaging a mating member. Each retention region consists of a circumferential series of alternating prongs and recesses. The insert is manufactured by selecting or processing a solid raw bar to produce an engineered rod having a plurality of axially continuous protrusions at a protrusion diameter alternating circumferentially with a plurality of axially continuous channels at a channel diameter. At axial intervals, the diameter of the engineered rod is decreased with a form tool to a base diameter smaller than the channel diameter, thereby producing a featured rod having a series of axially alternating spacer regions at the base diameter and radially outwardly extending feature regions consisting of a circumferential series of alternating prongs and recesses.

13 Claims, 6 Drawing Sheets

(56) References Cited

U.S. PATENT DOCUMENTS

| | | | | |
|---|---|---|---|---|
| 4,825,932 | A * | 5/1989 | Tildesley | F16B 37/122 164/113 |
| 5,266,258 | A * | 11/1993 | Martin | B29C 65/44 264/249 |
| 6,474,918 | B1 * | 11/2002 | Kelch | F16B 35/047 411/180 |
| 6,692,207 | B1 * | 2/2004 | Bailey | F16B 37/122 411/180 |
| 7,287,944 | B2 * | 10/2007 | Ladouceur | B23P 19/062 29/512 |
| 7,380,326 | B2 * | 6/2008 | Kovac | B23P 19/062 29/243.5 |
| 8,985,925 | B2 * | 3/2015 | Lan | F16B 33/004 411/180 |
| 2005/0084362 | A1 * | 4/2005 | Nah, II | F16B 37/122 411/180 |
| 2011/0281133 | A1 * | 11/2011 | Moessinger | B22D 17/24 428/600 |
| 2012/0328391 | A1 * | 12/2012 | Levey | F16B 37/068 411/337 |
| 2013/0017032 | A1 * | 1/2013 | Levey | F16B 37/122 411/103 |
| 2015/0023757 | A1 * | 1/2015 | Chang | F16B 37/048 411/173 |
| 2016/0040707 | A1 * | 2/2016 | Droste | F16B 33/002 411/321 |

* cited by examiner

EXTRUDED METAL INSERT

BACKGROUND

The present invention relates to internally threaded metallic inserts for plastics, manufactured from a raw metal rod and designed to provide stronger threads in a weaker host material.

The common method of providing thread load performance to accepted engineering standards in plastic sections is through the use of internally threaded metallic inserts. These inserts are usually manufactured from non-ferrous materials such as brass and aluminum, but may be manufactured from ferrous materials such as steel and stainless steel. They can be molded into plastic sections during their creation (known as molded in), or they can be installed into a preexisting cavity in an already molded part using axial pressure (known as post molding). Post molding techniques can include preheating and ultrasonic to sufficiently heat the insert enough to transfer that energy to soften the plastic material allowing it to flow fully in and around the external profiles of the insert as it is inserted into the hole. This creates maximum potential for torque and pull out resistance up to the design limitations of the insert.

Inserts are most commonly manufactured by the metal turning process using a 12 to 16 foot long bar. The machinery is generally an automatic screw machine, a CNC machine, or a rotary transfer machine. Some inserts are manufactured using turning equipment employing coiled material.

Some inserts are created via a zinc die casting technology which can cast an identical shape to the inserts being applied for protection in this patent application.

Standard to the industry, the performance of an insert is created by features machined onto the outside profile of a round, hexagon or other shaped bar or coil of raw material. These features have two distinctly different purposes but they work in conjunction with each other. One purpose is resistance to pull out so the insert stays in the hole. Those features are machined around the circumference and perpendicular to the thread axis and are referred to as ribs, undercuts, grooves and barbs. They grip by allowing the host material to flow in and around their shape during installation to provide the high resistance to pullout due to their configurations. The second is resistance to torque so the insert does not spin in the host material as the mating fastener is either tightened or loosened. This feature is most commonly rolled onto the insert as knurling, or points around its periphery, or machined on from the end as a broaching operation. Knurling and broaching create this sharp edged series of points around the periphery of the part which dig into the host and prevent the insert from turning as the torque is applied through the mating fastener.

Other methods sometimes used to create torque resistance can be the shape of standard hexagon or square bar but these methods have the limitation of being much larger in diameter as the circle around the points of the hex or square requires a much wider boss to contain them than does a round bar with knurls that is more compact and narrow by comparison.

The most common forms of knurling are straight, helical (angular), or male or a female diamond pattern. Some manufacturers produce two opposing knurling patterns on the same part in an effort to resist torque during the assembly and disassembly process. To achieve the correct knurl shape and specification, knurling requires a precision diameter on which to roll or broach. Usually a precision knurl requires a forming operation to remove the bulk of material down to a smaller diameter, then a light precision shaving operation to bring the formed diameter to the pre-knurled design diameter, and then the rolling operation itself, forming the knurl into the metal surface to achieve an exact tooth count around the part and to create faithfully its cross sectional shape. These three processes are time consuming during production and are sequentially interdependent. If one of the three operations is out of specification, the subsequent operations and the final resulting knurl pattern are at risk of not meeting the design criteria. This can result in poor insert performance due to mis-tracked or double tracked knurls, broken knurls, slivers, poor displacement, and out of spec knurl diameter on the part. In total, these three processes can be the most difficult metal cutting operations to control consistently in high production high speed automatic screw machines yet they create one of the most important characteristics of the insert's design.

SUMMARY

The main object of this invention is to simplify production, especially eliminating the three operations described immediately above, while keeping the outside diameter of the insert compact when compared to hexagon or a square insert design.

The invention is directed to a novel manufacturing method, a novel insert shape, and the combination of a novel insert embedded in a host, such as a plastic part. Preferably, the novel insert is produced from a specially engineered bar stock that is subjected to a special metal forming that does not require machining or knurling operations.

The invention thus eliminates the difficult to machine features onto the part, and the need for continual machine adjustments to manufacture those features consistently and within the design specifications. These adjustments are time consuming and affect production output due to downtime to correct ever changing conditions of manufacturing as tooling goes dull and requires the tool to be removed and replaced and reset.

The invention replaces knurled and broached features which are common to insert production. More specifically, the invention reduces manufacturing time and production costs due the engineered features of the raw material design allowing the material shape to replace features formerly machined onto the part. The problems with maintaining machine adjustments for pre knurled part dimensions to create a consistent knurled feature have been eliminated entirely.

A pre-shaped bar becomes a feature of the finished part. These parts are primarily turned from aluminum bar stock, but may employ identical principles and be manufactured from other materials such as brass and steels. The part uses the specially shaped engineered bar stock as an anti-rotation feature. The shape consists of multiple ribs or protrusions drawn or extruded along its entire length. The ribs are engineered in cross section to prevent the insert from turning in rotation as the mating fastener is tightened to its engineered clamp load and sometimes beyond. Bar shape is designed in conjunction with the size and clamp load requirements of the mating fastener. Undercuts are added perpendicular to the extrusion shape to prevent the insert from pulling out of the material as the mating fastener is tightened to proof load. These inserts are designed to perform in mold in applications, are narrower in diameter than using a standard hexagon or square shaped bar for the same purpose. Additionally, these parts do not have the production problems associated with forming, shaving, and knurling, as those operations are removed from the production process.

The various raw material bars for these inserts have an engineered shape with protrusions along their entire length. These protrusions will replace the need for knurl bands as the method used for resistance to torque in the application. This bar shape also has the advantages of being bidirectional resisting torque during installation and disassembly similar to the opposite knurling patterns cited earlier. The invention is primarily directed to replace knurling and broaching for inserts used for mold in applications, but it may have application to the post molding installation techniques as well. The result is a much simpler to manufacture part, requiring significantly less tooling, and no machine adjustments for this feature, a better degree of consistent quality and performance than the traditional methods of forming, shaving and knurling, and a smaller and more compact diameter than a hexagon or square insert can offer as a method of creating torque resistance.

In the preferred embodiment, a specific shape is drawn onto the bar or coil of raw material, rather than adding it during a machining process to counteract torque during and after installation. This is accomplished by drawing or extruding raw material with pre-engineered protrusions and undercuts along the axis of the bar to create to that shape. Machining identical grooves into a bar in the same axial manner to result in that same shape is not a part of this patent application. It is the pre shaped bar of raw material which creates the benefits of much lower production costs and time cycles in producing these parts. These protrusions are pre-formed into the raw material and act in the same manner as knurling applied in a standard manufacturing process for resisting torque. Therefore in its manufacturing process to completion the insert only requires a forming operation to create the undercuts, ribs, and barbs perpendicular to its axis.

In order to create the draw die for the bar or coil to create the shape, the invention requires that an engineered percentage of undercut be established for torque resistance by bolt size. The cross section of the protrusions drawn or extruded onto the bar length will have enough face area in the host material to counteract the torque to failure requirements as established. Ideally the bolts will break in torque before the insert will twist in the plastic after it has been molded in, provided the plastic is of sufficient strength.

This design applies to inserts with a blind end (threaded from one side only) and those with a through hole and threaded completely through so it may be installed from either orientation.

BRIEF DESCRIPTION OF THE DRAWING

An illustrative embodiment will be described with reference to the accompanying drawing, in which.

DETAILED DESCRIPTION

Figure 1:
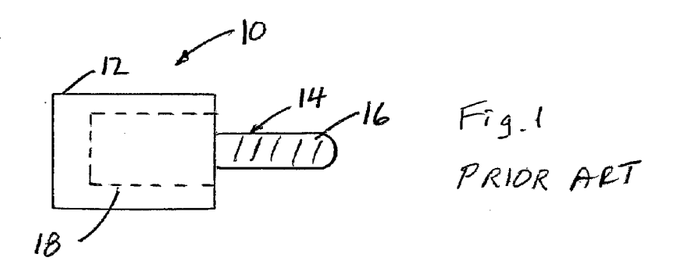
FIG. 1 is a schematic side view of a known type of plastic host part with an embedded metal insert having a projecting threaded stud.
Figure 2:
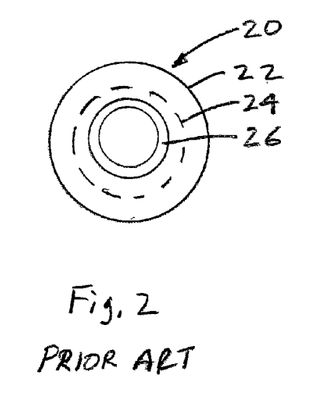
FIG. 2 is a schematic end view of a known type of host plastic part with an embedded metal insert having internal threads.

FIG. 1 is a schematic side view of a known type of completed fixture assembly 10 comprising a cylindrical host 12 with projecting stud or bolt 14 having threads 16 which integrally extend from a metal insert 18 embedded in (e.g., molded-in) the host. In typical end-uses, the host is plastic and can be any shape but for convenient reference the host will be considered a cylindrical plastic part, commonly referred to as a boss. FIG. 2 is a schematic end view of a known type of fixture assembly 20 with cylindrical plastic host 22 including an embedded metal insert 24 having internal threads 26.

Figure 3:
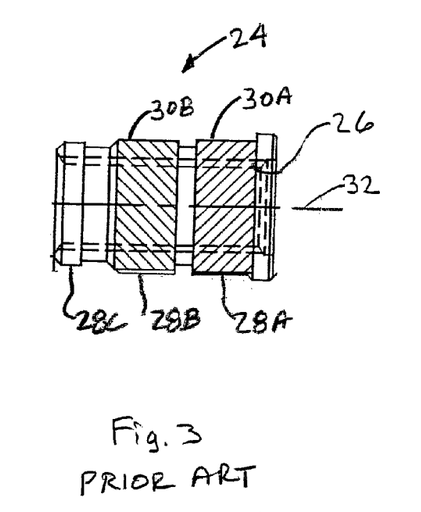
FIG. 3 is a schematic longitudinal view of a known type of knurled metal insert with internal threads for embedding in the plastic part such as represented in FIG. 2.

FIG. 3 shows a typical knurled metal insert 24 with internal threads 26 for embedding in a host as represented in FIG. 2. These are typically machined from round bar stock that is shaved, subjected to knurling tools, then finish shaved to produce axially spaced retention features 28a, 28b, 28c which include knurled surfaces 30a, 30b. The knurling provides a series of oblique parallel ridges that define surface areas that have a cross sectional component perpendicular to the axis 32 for resisting torque around axis 32. The retention features on the insert 18 associated with FIG. 1 are similar.

Figure 4:
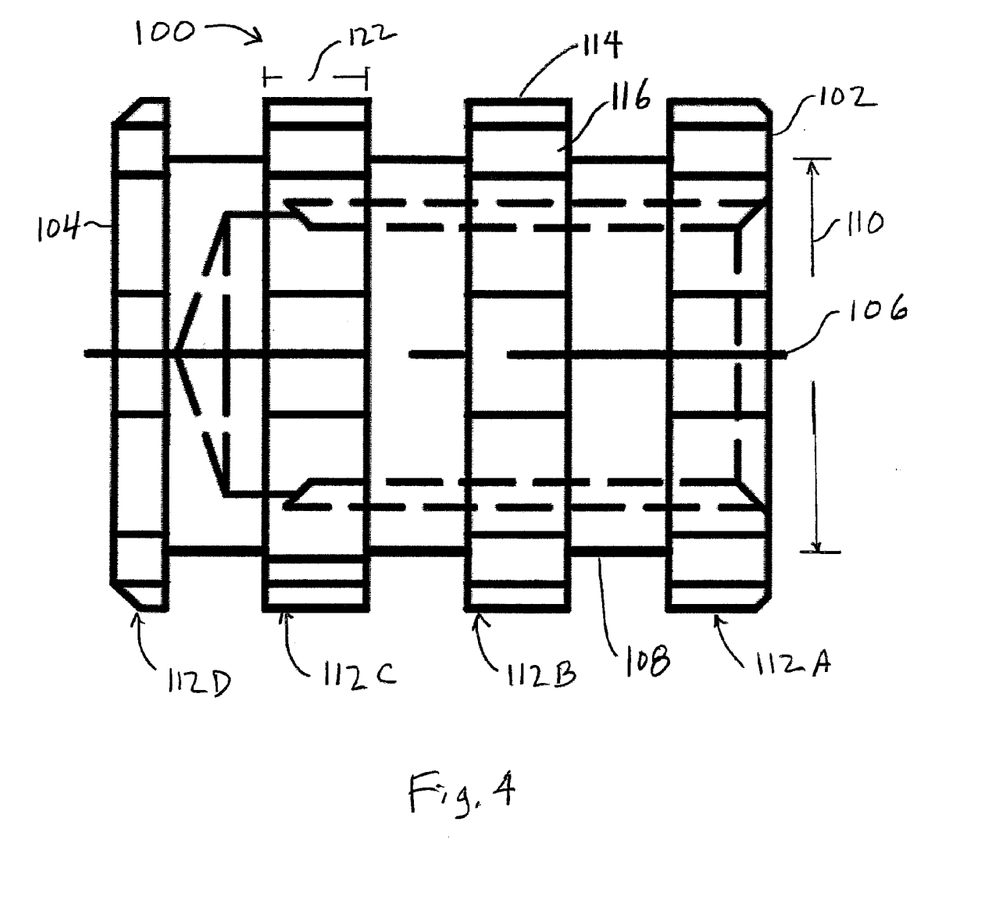
FIG. 4 is a schematic side view of an embodiment of the present invention, showing an insert comprising a substantially cylindrical body having a base diameter, a series of retention regions axially spaced apart along the body and extending radially outward from the base diameter, with each retention region consisting of a circumferential series of alternating protrusions and recesses.
Figure 5:
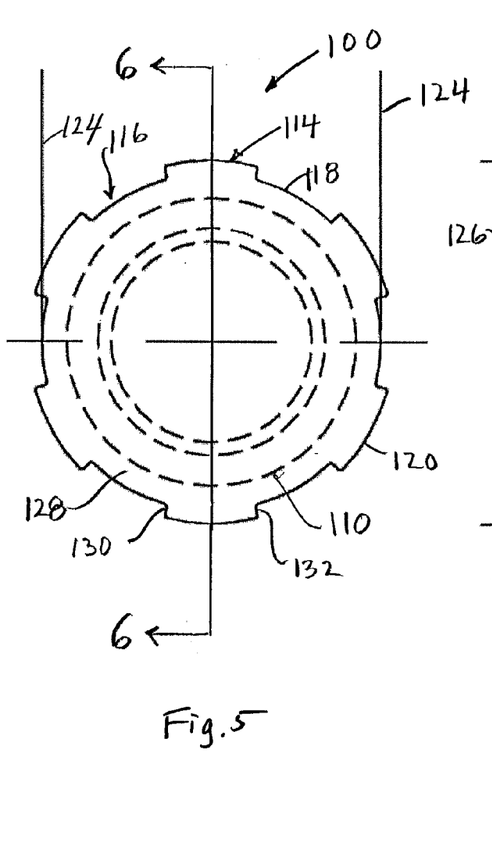
FIG. 5 is an end view of the metal insert of FIG. 4.
Figure 6:
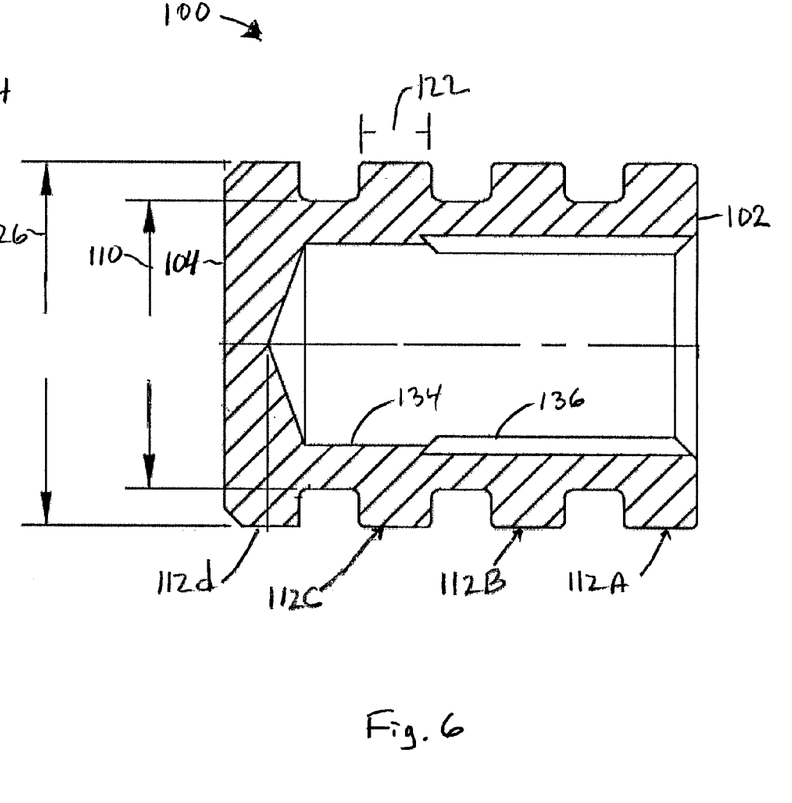
FIG. 6 is a longitudinal section view along line 6-6 of FIG. 5.

The present invention improves upon the type of inserts represented in FIGS. 1-3, and others (not shown) wherein the features are in a hexagonal retention region. FIGS. 4-6 show a metal insert 100 having a front 102 and a back 104 spaced apart along longitudinal axis 106. A substantially cylindrical body 108 has a base diameter 110 and a series of retention regions 112a, 112b, 112c, 12d spaced apart along and extending radially outward from the base diameter 108. Each retention region 112 consists of at least two retention features, in this case a circumferential series of alternating protrusions 114 and recesses 116. The recesses have respective bottom surfaces 118 that are concentrically aligned on an inner radius of curvature and the protrusions have respective outer surfaces 120 that are concentrically aligned on a greater, outer radius of curvature. Preferably, for each retention region, the recesses and the protrusions are circumferentially aligned with the same axial width 122.

Each retention region 112 defines one feature in the form of ring 128 of uniform diameter 124 greater than the base diameter 110, extending from the base diameter, and another feature 114 in each retention region defining a plurality of circumferentially spaced apart prongs integrally protruding from the ring. The ring 128 is the annular mass of material between diameters 124 and 110, whereas each prong 114 has an arcuate outer surface 120 that is concentric with an exposed arcuate surface 118 of the ring. Each prong 114 has exposed side surfaces 130, 132 that extend (preferably with an undercut) to the exposed arcuate outer surface 118 of the ring at the ring diameter. The side surfaces can be substantially radial (i.e., 90 degrees to the tangent at the edge of the prong surface 120), or undercut at an angle less than 90 degrees. The prong surface 120, recess surface 118, and side surfaces 130, 132 extend parallel to the axis a distance corresponding to the width 122 of feature region 112.

In general, a plurality of feature regions 112 is provided and each feature region should include at least four, and up to eight prongs 114 and corresponding number of recesses 116. Preferably, the prongs and recesses should have substantially the same angular span, most preferably six prongs and six recesses, each spanning an arc of about 30 deg. When the insert 100 is embedded in the host material (e.g., plastic), the plastic occupies the recesses 116 and abuts the side surfaces 130, 132. As a result, a plurality of the side surfaces 130 or 132 on a plurality of feature regions 112 act against the abutting plastic material to prevent torque loads imposed within the insert, from twisting the insert relative to the plastic host. The rings 128 provide the main resistance to axial pullout.

As can be understood from FIGS. 4-8, each given retention region 112a, 112b, 112c, and thus the respective ring feature is individually distinct and preferably axially spaced apart from another retention region or ring by a distance at least equal to the axial width 122 of the given retention region or ring. Also as shown in FIGS. 5 and 6, the diameter 110 of base 108 is uniform, and the difference in diameters 124, 110 between the rings and the base is preferably larger than the difference in diameters 126, 124 between the prongs and the rings. With four to eight prongs 114 and recesses 116, each of approximately the same circumferential length, there is ample circumferential space between the side surfaces of successive prongs. It can thus be appreciated that in the installed, overmolded condition of the insert, this combination of features results in the intimate molded contact of mold material between successive rings to resist axial displacement of the insert within the host and intimate molded contact of mold material in the recesses between successive prong side surfaces to resist rotation of the insert within the host part.

The inventive insert can be formed with a conventional male or female end effector such as bolt 14 shown in FIG. 1 or internal thread, for engaging an end-use mating member (not shown). FIG. 6 shows an axial blind bore 134 with internal threads 136 extending axially within the body from the front toward the back.

Figure 7:
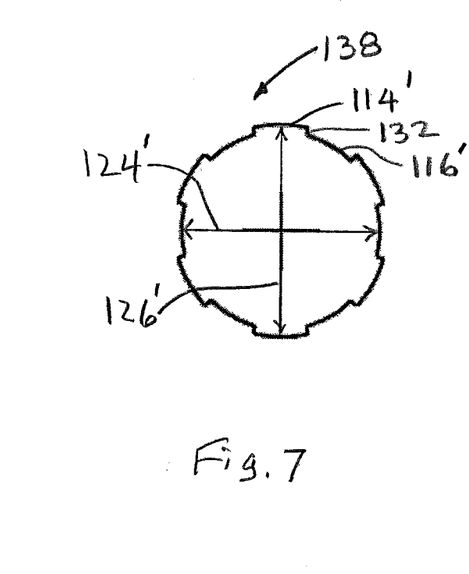
FIG. 7 shows the preferred shape of the engineered rod used for making the disclosed metal insert.
Figure 8:
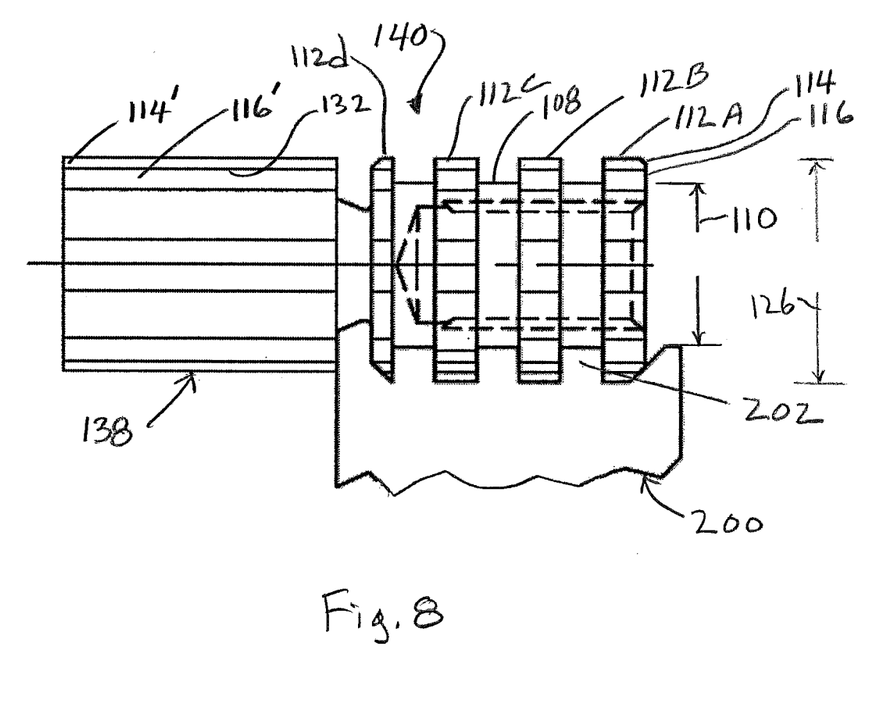
FIG. 8 schematically represents one manufacturing step performed at the free end of the engineered rod of FIG. 7 during formation of the axially spaced apart retention regions shown in FIGS. 4-6.
Figure 9:
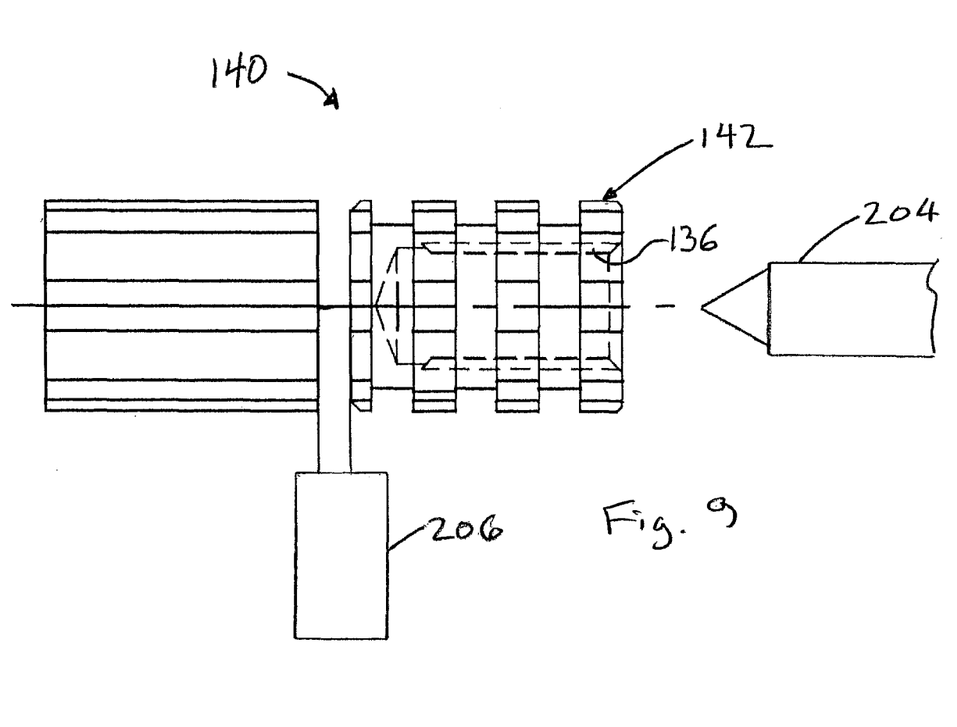
FIG. 9 shows an engineered rod after removal of the form tool represented FIG. 8, with the formed free end coaxially aligned with a thread forming device and a parting tool, for producing the internally threaded insert shown in FIG. 6.

FIGS. 7-9 represent various steps in the preferred manufacturing of the metal insert of the type shown in FIGS. 4-6. FIGS. 7 and 8 show the preferred shape of the engineered bar or rod stock 138 used for making the disclosed metal insert. A raw, solid metal rod having a raw diameter is processed to produce an engineered rod having a plurality of axially continuous protrusions 114' alternating circumferentially with a plurality of axially continuous channels 116', whereby the protrusions define a protrusion diameter 126' through the engineered rod and the channels define a smaller channel diameter 124' through the engineered rod.

FIG. 8 is a schematic representation of the free end 140 of the engineered rod of FIG. 7, situated in a form tool 200 during formation of the axially spaced apart retention regions 112a-d at axially spaced apart intervals along the engineered rod. As the rod is rotated, the longitudinally spaced apart edges 202 on form tool 200 remove protrusion material 114' and recess material 116' at axial intervals, down to the diameter 110, thereby defining the body 108 of the pre-insert shown in FIG. 8, and the final insert. The material that is not removed by the form tool 200 remains as the axially spaced apart feature regions 112 in the pre-insert and the final insert. Thus, the spaces between the feature regions are at a circumferentially uniform base diameter 110 smaller than the channel diameter 124 (FIG. 5), thereby producing a featured rod having a series of axially alternating spacer regions at the base diameter 110 and radially outwardly extending retention regions to the protrusion diameter 126, which is the same as 126'. The remainder of protrusion 114' becomes prongs 114 and the remainder of channel 116' becomes recesses 116.

FIG. 9 shows a featured engineered rod 142 after removal from the form tool represented FIG. 8, with the formed free end 140 coaxially aligned with a thread forming tool 204 and parting or cutoff tool 206 for completing the internally threaded insert shown in FIG. 6. In sequence, the rod 138 is fed, featured, and cut corresponding to the specified insert length to produce a multiplicity of inserts, each having a specified plurality of feature regions. The threads 136 can be formed at any stage of the process. FIG. 8 shows that the threads can be formed before the free end 140 of the engineered rod is disengaged from the form tool 200, whereas FIG. 9 shows forming the threads on the free end after removal from the form tool and before the final step of cutting a finished insert off the rod 142.

In the preferred embodiment, the step of processing the raw rod to produce an engineered rod 138 having a plurality of axially continuous protrusions 114' alternating circumferentially with a plurality of axially continuous channels 116' is performed without machining, e.g., by die forming such as drawing or extrusion. Round bar stock is engineered to the desired rod profile whereby the diameters of the retention features 126 and 124 are in effect "built in", with the radial width of the retention ring 128, the axial width 122 of the feature region, and the axial spacing between retention regions established by the form tool 200. Even the preferred undercut surfaces 130, 132 of the protrusions 114 in the finished inserts are set at the time the channel 116' is formed in the bar stock. It is self-evident that the internal shape of the die for forming the outer profile of the engineered rod 138 as shown in FIG. 7 would have the same cross sectional profile.

The inventive method can be implemented and the resulting inventive insert can be produced in an alternative manner, even if the channels 116' are initially machined or cast into the round bar stock, but this is less cost-effective than die forming the channels. Similarly, the structural aspects of the inventive insert could be produce by other than the presently described processes, such as by casting.

Figure 10:
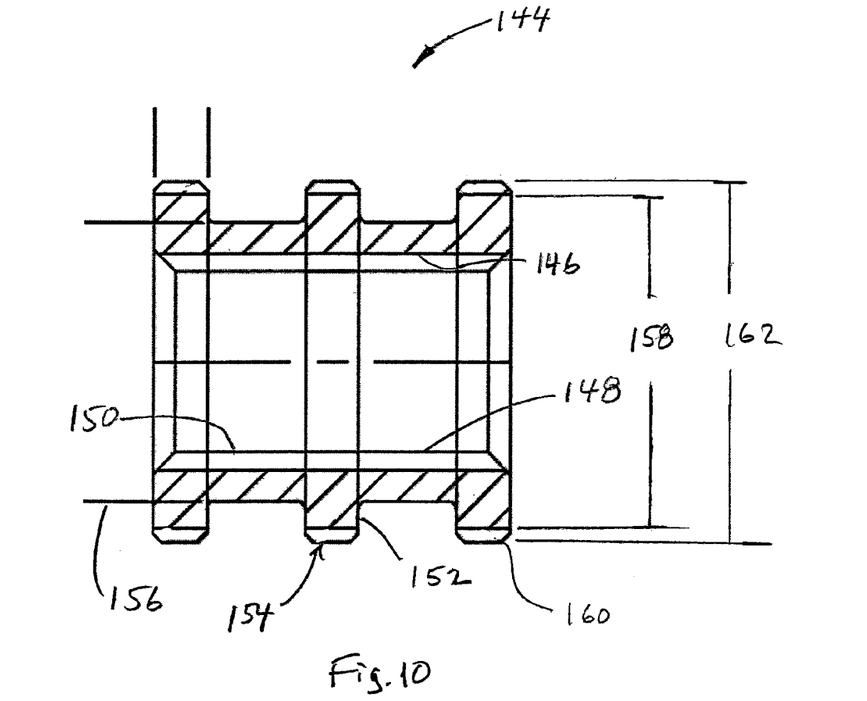
FIG. 10 is a longitudinal section view of an alternative embodiment of an internally threaded insert, with a through bore and through threads.

FIG. 10 shows an alternative embodiment 144 of an internally threaded insert, with a through bore 146 and through threads 148, 150. As with the embodiment of FIGS. 4-7, the annular ring 152 on each of the three retention regions such as 154 is defined by the difference between base diameter 156 and the channel diameter 158, and the circumferentially spaced prongs 160 have a radial depth defined by the difference between the channel diameter 158 and the protrusion or prong diameter 162. The section view in FIG. 10 is through opposite channels (through diameter 158), whereas the section view in FIG. 6 is through opposite protrusions (through diameter 126).

In yet another embodiment corresponding to FIG. 1, the step of forming an end effector includes forming a threaded or unthreaded bolt, stud or the like at the free end of the engineered rod before the step of selectively decreasing the diameter of the engineered rod to a circumferentially uniform base diameter smaller than the channel diameter. In the finished insert, the stud integrally projects from the front of the insert. Regardless of the type and technique for forming the end effector, at an axial distance along the featured rod from the free end spanning a plurality of feature regions and a plurality of spacer regions, the featured rod is severed to produce a finished insert having an end effector and a plurality of feature regions.

The invention claimed is:

1. A metal insert having a central axis extending from front to back ends, comprising:
   a substantially cylindrical body having a uniform base diameter;
   a plurality of individually distinct retention regions spaced apart along and extending radially outward from the axis;
   one feature in each retention region defining a ring of uniform diameter greater than the base diameter;
   another feature in each retention region defining a plurality of circumferentially spaced apart prongs integrally protruding from the ring;
   wherein
      each ring extends at a constant axial width from the base diameter, each prong extends from the ring with said constant axial width, and each prong has an arcuate outer surface that is concentric with an exposed arcuate surface of the ring, defined between circumferentially spaced apart side surfaces of adjacent prongs, and
      each ring is axially spaced apart from another ring by a distance at least equal to the axial width of the given ring; and
   an end effector at one end, for engaging a mating member.

2. The metal insert of claim 1, wherein the end effector is an internally threaded bore extending axially within the body from the front toward the back.

3. The metal insert of claim 2, in combination with a molded plastic host part, wherein the retention regions of the insert are embedded within and in intimate molded contact with the host.

4. The metal insert of claim 1, wherein the end effector integrally projects from one end of the insert.

5. The metal insert of claim 4, wherein the end effector is a stud.

6. The metal insert of claim 1, wherein each prong has exposed side surfaces that extend substantially radially inward to an exposed arcuate outer surface of the ring at the ring diameter.

7. The metal insert of claim 6, in combination with a molded plastic host part, wherein the retention regions of the insert are embedded within and in intimate molded contact with the host.

8. The metal insert of claim 6, wherein each retention region consists of four to six recesses and four to six prongs.

9. The metal insert of claim 1, in combination with a molded plastic host part, wherein the retention regions of the insert are embedded within and in intimate molded contact with the host.

10. The metal insert of claim 9, wherein the intimate molded contact of mold material between successive rings resists axial displacement of the insert within the host part and intimate molded contact of mold material in the recesses between successive prongs resists rotation of the insert within the host part.

11. The metal insert in combination with a molded host part as recited in claim 10, wherein the difference in diameters between the rings and the base is larger than the difference in diameters between the prongs and the rings.

12. The metal insert in combination with a molded host part as recited in claim 11, wherein four to eight prongs and four to eight recesses are provided on each retention region, each of the same circumferential length.

13. A metal insert having a central axis extending from front to back ends, comprising:
   a substantially cylindrical body having a uniform base diameter;
   a plurality of individually distinct retention regions spaced apart along and extending radially outward from the axis;
   one feature in each retention region defining a ring of uniform diameter greater than the base diameter;
   another feature in each retention region defining a plurality of circumferentially spaced apart prongs integrally protruding from the ring with an outer diameter;
   wherein
      each retention region consists of four to eight recesses and four to eight prongs;
      each ring extends at a constant axial width from the base diameter, each prong extends from the ring with said constant axial width, each prong has an arcuate outer surface that is concentric with an exposed arcuate surface of the ring, defined between circumferentially spaced apart side surfaces of adjacent prongs;
      each given ring is axially spaced apart from another ring by a distance at least equal to the axial width of the given ring;
      the difference in diameters between the rings and the base is larger than the difference in diameters between the prongs and the rings;
   and
   an end effector at one end, for engaging a mating member.

* * * * *